(12) United States Patent
Jain et al.

(10) Patent No.: US 9,317,639 B1
(45) Date of Patent: Apr. 19, 2016

(54) SYSTEM FOR REDUCING POWER CONSUMPTION OF INTEGRATED CIRCUIT

(71) Applicants: Rahul Jain, Noida (IN); Nitin Dhamija, Rohtak (IN); Umesh Chandra Lohani, Noida (IN)

(72) Inventors: Rahul Jain, Noida (IN); Nitin Dhamija, Rohtak (IN); Umesh Chandra Lohani, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 8 days.

(21) Appl. No.: 14/523,958

(22) Filed: Oct. 27, 2014

(51) Int. Cl.
*G06F 17/50* (2006.01)
(52) U.S. Cl.
CPC ........ *G06F 17/5031* (2013.01); *G06F 17/5072* (2013.01); *G06F 17/5077* (2013.01); *G06F 17/5081* (2013.01); *G06F 2217/02* (2013.01); *G06F 2217/78* (2013.01)
(58) Field of Classification Search
CPC ............ G06F 17/5072; G06F 17/5081; G06F 17/5077; G06F 17/5031; G06F 2217/78; G06F 2217/02
USPC ............. 716/133, 129, 120, 108, 109; 703/16
See application file for complete search history.

(56) References Cited

U.S. PATENT DOCUMENTS

| | | | | |
|---|---|---|---|---|
| 3,641,509 A * | 2/1972 | Di Vita | ...................... | H03K 5/26 324/111 |
| 3,958,088 A * | 5/1976 | Vieri | ........................ | G06F 13/22 178/3 |
| 4,016,549 A * | 4/1977 | Hutner | ..................... | G06F 3/002 358/1.16 |
| 4,218,738 A * | 8/1980 | Matyas | .................... | G06F 21/31 340/5.26 |
| 4,314,335 A * | 2/1982 | Pezzi | ..................... | G06F 13/364 710/243 |
| 4,748,417 A * | 5/1988 | Spengler | ................... | G06F 1/08 327/152 |
| 4,987,530 A * | 1/1991 | Wagner | ................. | G06F 3/0601 710/1 |
| 5,498,988 A | 3/1996 | Reyes et al. | | |
| 5,579,510 A * | 11/1996 | Wang | .................. | G06F 17/5031 703/19 |
| 5,808,486 A * | 9/1998 | Smiley | ....................... | G06F 1/08 327/294 |
| 5,811,995 A * | 9/1998 | Roy | ....................... | H04L 7/0083 327/298 |
| 5,886,582 A * | 3/1999 | Stansell | .................... | G06F 1/10 327/143 |
| 6,100,732 A * | 8/2000 | Penry | ........................ | G06F 1/08 327/144 |
| 7,023,240 B2 | 4/2006 | Elappuparackal | | |
| 7,287,105 B1 * | 10/2007 | Owen | ....................... | G06F 1/12 365/189.08 |

(Continued)

*Primary Examiner* — Phallaka Kik
(74) *Attorney, Agent, or Firm* — Charles E. Bergere

(57) ABSTRACT

A method for reducing dynamic power consumption of an integrated circuit design having flip-flops with an EDA tool that initiates clock gating by gating a clock signal received by the flip-flops. A first set of positive-edge triggered flip-flops and a second set of negative-edge triggered flip-flops, and a first set of OR-type clock gating cells and a second set of AND-type clock gating cells are selected from a technology library. The OR-type clock gating cells are connected to clock input terminals of the first set of positive-edge triggered flip-flops and the AND-type clock gating cells to clock terminals of the second set of negative-edge triggered flip-flops.

8 Claims, 7 Drawing Sheets

(56) References Cited

U.S. PATENT DOCUMENTS

| | | | |
|---|---|---|---|
| 7,808,279 B2 | 10/2010 | Srivastava et al. | |
| 7,872,514 B2 | 1/2011 | Chee | |
| 7,884,649 B1 | 2/2011 | Savoj et al. | |
| 8,751,983 B1* | 6/2014 | Mitchell | G06F 17/5045 716/102 |
| 8,860,468 B1* | 10/2014 | Khandelwal | G06F 1/08 327/298 |
| 2002/0006177 A1* | 1/2002 | Pickering | G06F 13/4269 375/371 |
| 2003/0001612 A1* | 1/2003 | Menezes | G06F 1/08 326/37 |
| 2004/0021485 A1* | 2/2004 | Kanazawa | H03K 19/0016 326/83 |
| 2004/0095166 A1* | 5/2004 | Yamazaki | G06F 1/08 327/99 |
| 2004/0104749 A1* | 6/2004 | Yeh | H04L 7/02 327/141 |
| 2006/0022661 A1* | 2/2006 | Deppe | G06F 1/3209 324/67 |
| 2006/0091912 A1* | 5/2006 | Ghosh | G06F 1/12 326/93 |
| 2006/0218307 A1* | 9/2006 | Van Dyke | G06F 9/30141 710/8 |
| 2007/0152719 A1* | 7/2007 | Wu | G06F 1/12 327/99 |
| 2007/0174648 A1* | 7/2007 | Panchal | H03K 23/507 713/500 |
| 2009/0256609 A1 | 10/2009 | Naffziger | |
| 2009/0319821 A1* | 12/2009 | Tyrrell | H03K 5/1252 713/601 |
| 2010/0235672 A1* | 9/2010 | Zhang | G06F 1/12 713/400 |
| 2011/0185215 A1* | 7/2011 | Neben | G06F 1/12 713/401 |
| 2011/0194575 A1* | 8/2011 | Chen | G06F 1/06 372/25 |
| 2011/0239031 A1* | 9/2011 | Ware | G11C 7/04 713/500 |
| 2012/0274377 A1 | 11/2012 | Alben | |
| 2013/0297961 A1* | 11/2013 | Zhu | G06F 1/04 713/401 |

\* cited by examiner

SYSTEM FOR REDUCING POWER CONSUMPTION OF INTEGRATED CIRCUIT

BACKGROUND OF THE INVENTION

The present invention relates generally to electronic design automation (EDA) tools, and, more particularly, to an EDA tool capable of modifying an integrated circuit design for reduced dynamic power consumption.

Integrated circuits (ICs), such as systems-on-chip (SoCs) include combinational and sequential logic elements including flip-flops and latches that operate based on toggling of a clock signal received by the SoC. The flip-flops and latches consume a significant amount of power. The outputs of the flip-flops and latches change at every edge of the clock signal, which adds to the power consumption because the power consumed is directly proportional to operational voltage and operational frequency of the clock signal. The magnitude of the power consumed can be calculated using the equation (1):

$$\text{Power consumed} = \alpha * C * V^2 * F \quad (1)$$

where, $\alpha$=switching factor of the clock signal,
C=load capacitance that is charged or discharged during each cycle of the clock signal,
V=operational voltage of the SoC, and
F=operational frequency of the clock signal.

Power consumption may be reduced by controlling the above parameters. Reducing the operational frequency of the clock signal affects circuit performance, while reducing the operational voltage increases propagation delays of the logic circuits. The switching factor ($\alpha$) and the capacitance (C) can be reduced by disabling the clock signal when the flip-flops and the latches are idle.

One technique for disabling the clock signal is to gate the clock signal using a clock gating cell, which saves dynamic functional power. Clock gating cells are generally inserted into the design during the RTL design synthesis stage. Groups of flip-flops that share a common enable control signal or have a common enable condition are selected during the RTL design synthesis state. The enable control signal is used to control a clock gating cell that is connected to clock input terminals of the flip-flops of the selected group of flip-flops. When the enable control signal is low, the dynamic power consumption across the selected group of flip-flops is zero, which results in a considerable reduction in power consumption.

Typically, RTL clock gating is of two types: latch-free and latch-based. In latch-free clock gating, AND and OR gates are used to gate the clock signal when the selected group of flip-flops are idle. The enable control signal for the selected group of flip-flops and the clock signal are input to the AND gate or the OR gate. Based on the logic state of the enable control signal, the gate generates a gated clock signal that is provided to the clock input terminals of the flip-flops. The AND gate generates a logic low gated clock signal and the OR gate generates a logic high gated clock signal when the enable control signal is low. However, when the logic state of the enable control signal toggles between two pulses of the clock signal, the gated clock signal is either terminated prematurely or generates multiple clock pulses with indeterminate time periods. Hence, latch-free clock gating is not preferred for clock gating of flip-flops that use a single clock signal.

In latch-based clock gating, the enable control signal is provided to a data input terminal of a level-sensitive latch. The latch also receives the clock signal at its clock input terminal. An output of the latch is provided to either an AND gate or an OR gate. The gate also receives the clock signal and outputs the gated clock signal at low and high states, respectively, when the enable control signal is low. The latch captures the logic state of the enable control signal and holds the captured logic state until a complete pulse of the gated clock signal is generated. Hence, the logic state of the enable control signal must be stable only at the rising edge of the clock signal for the gated clock signal to be generated accurately.

Modern EDA tools have built-in functionality to choose the AND-type latch-based clock gating cells for gating the clock signal received by the selected group of flip-flops. A flip-flop includes a master latch and a slave latch. A positive-edge triggered flip-flop has a low-active master latch and a high-active slave latch, and a negative-edge triggered flip-flop has a high-active master latch and a low-active slave latch. When the selected group of flip-flops includes positive-edge triggered flip-flops and the AND-type latch-based clock gating cell is used, the master latch of each positive-edge triggered flip-flop of the selected group receives the gated clock signal at logic low state. As a result, the master latch of each positive-edge triggered flip-flop is set in a transparent mode. Hence, any change at a data input terminal of the master latch of each positive-edge triggered flip-flop is reflected at an output terminal of the master latch, thereby increasing internal dynamic power consumption of the positive-edge triggered flip-flops during idle state.

FIG. 1 is a schematic block diagram of a conventional system 100 for gating a clock signal. The system 100 includes a positive-edge triggered D flip-flop 102, a multiplexer 104, and an AND-type latch-based clock gating cell 106. The clock gating cell 106 includes a D latch 108 and an AND gate 110. A data input terminal of the D latch 108 receives an enable control signal and a clock input terminal of the latch 108 receives the clock signal. A first input terminal of the AND gate 110 is connected to an output terminal of the D latch 108 for receiving the enable control signal and a second input terminal of the AND gate 110 receives the clock signal. The AND gate 110 outputs a gated clock signal at its output terminal. A first input terminal of the multiplexer 104 is connected to an output terminal of the D flip-flop 102 for receiving an output signal of the D flip-flop 102 and a second input terminal of the multiplexer 104 receives a data input signal. A select input terminal of the multiplexer 104 receives the enable control signal. A data input terminal of the D flip-flop 102 is connected to an output terminal of the multiplexer 104 for receiving one of the data input signal and the output signal of the D flip-flop 102. A clock input terminal of the D flip-flop 102 is connected to the output terminal of the AND gate 110 for receiving the gated clock signal.

When the enable control signal and the clock signal are at low, the D latch 108 outputs a low enable control signal. The AND gate 110 outputs a low gated clock signal upon receiving the low enable control signal at its first input terminal. The multiplexer 104 outputs the output signal of the D flip-flop 102 to the data input terminal of the D flip-flop 102 when the select input terminal of the multiplexer 104 receives the low enable control signal. Hence, a previous state of the D flip-flop 102 is held. As a result, the dynamic power consumption of the D flip-flop 102 is zero during the clock gating period, since there is no change at the data input terminal of the D flip-flop 102 when the enable control signal is low.

When the enable control signal is high and the clock signal is low, the D latch 108 outputs a high enable control signal. A logic state of the gated clock signal toggles based on a logic state of the clock signal when the AND gate 110 receives the high enable control signal at its first input terminal. The multiplexer 104 outputs the data input signal to the data input terminal of the D flip-flop 102 when the select input terminal of the multiplexer 104 receives the logic high enable control signal. Hence, the D flip-flop 102 is set in the transparent mode where any change in the data input terminal of the D flip-flop 102 is reflected at its output terminal. However, a SoC includes thousands of positive-edge triggered flip-flops and each requires a dedicated multiplexer connected at its data input terminal, which drastically increases chip area.

Therefore, it would be advantageous to have a system for reducing dynamic power consumption yet requires few design changes and does not drastically increase chip area.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
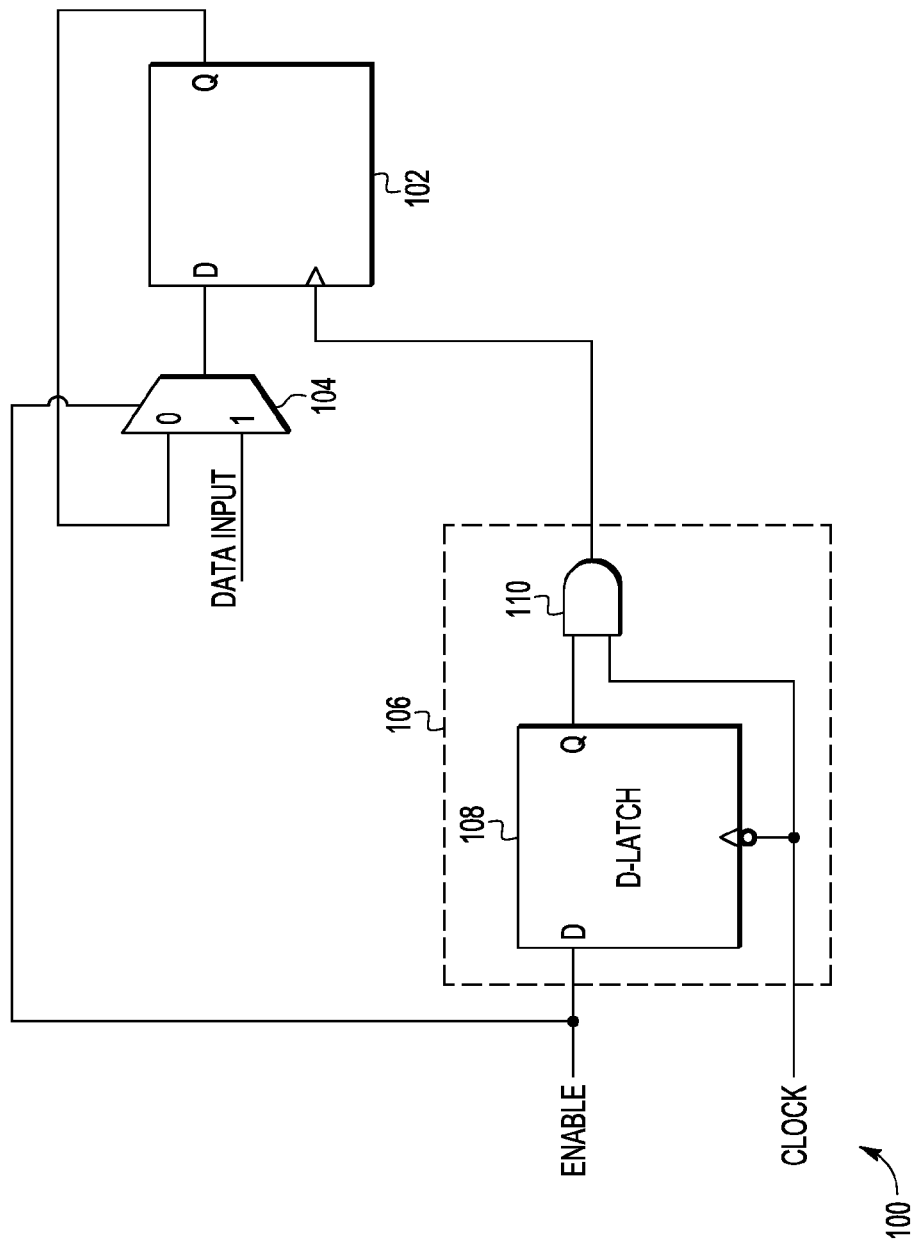
FIG. 1 is a schematic block diagram of a conventional system for gating a clock signal.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for reducing dynamic power consumption of an integrated circuit design using an electronic design automation (EDA) tool is provided. The EDA tool includes a memory, a processor in communication with the memory, and a technology library. The memory stores the integrated circuit design that includes a plurality of flip-flops. The processor initiates a clock gating of the plurality of flip-flops, based on the dynamic power consumption thereof. The processor identifies a first set of positive-edge triggered flip-flops and a second set of negative-edge triggered flip-flops of the plurality of flip-flops. The processor selects a first set of OR-type clock gating cells and a second set of AND-type clock gating cells from the technology library. The processor connects the first set of OR-type clock gating cells to clock terminals of corresponding first set of positive-edge triggered flip-flops and the second set of AND-type clock gating cells to clock terminals of corresponding second set of negative-edge triggered flip-flops. Thus, the integrated circuit design is modified. In various embodiments of the present invention, an integrated circuit is fabricated using the modified integrated circuit design.

Various embodiments of the present invention provide a system and method for reducing dynamic power consumption of an integrated circuit design by using an EDA tool. The integrated circuit design includes a plurality of flip-flops. A processor of the EDA tool determines the dynamic power consumption of the integrated circuit design and initiates clock gating of the plurality of flip-flops. The processor selects a first set of positive-edge triggered flip-flops and a second set of negative-edge triggered flip-flops of the plurality of flip-flops. The processor selects a first set of OR-type clock gating cells and a second set of AND-type clock gating cells from a technology library of the EDA tool. The processor connects the first set of OR-type clock gating cells to clock terminals of corresponding first set of positive-edge triggered flip-flops and the second set of AND-type clock gating cells to clock terminals of corresponding second set of negative-edge triggered flip-flops. Each positive-edge triggered flip-flop of the first set of positive-edge triggered flip-flops includes an active-low master latch and an active-high slave latch. Each negative-edge triggered flip-flop of the second set of negative-edge triggered flip-flops includes an active-high master latch and an active-low slave latch. The OR-type clock gating cell outputs a first clock gating signal at logic high state to corresponding clock input terminals of the first set of positive-edge triggered flip-flops. Upon receiving the logic high first clock gating signal, the master latch of each positive-edge triggered flip-flop of the first set of positive-edge triggered flip-flops is set in a latch mode, thereby eliminating dynamic power loss. Similarly, the AND-type clock gating cell outputs a second clock gating signal at logic low state to corresponding clock input terminals of the second set of negative-edge triggered flip-flops. On receiving the logic low clock gating signal, the master latch of each negative-edge triggered flip-flop of the second set of negative-edge triggered flip-flops is set in the latch mode, thereby eliminating dynamic power loss. Thus, as opposed to the conventional systems, the system of the present invention does not require any additional design changes for reducing the dynamic power consumption of the integrated circuit design, thereby reducing cost of production and area overheads of a chip on which the integrated circuit design is implemented.

Figure 2:
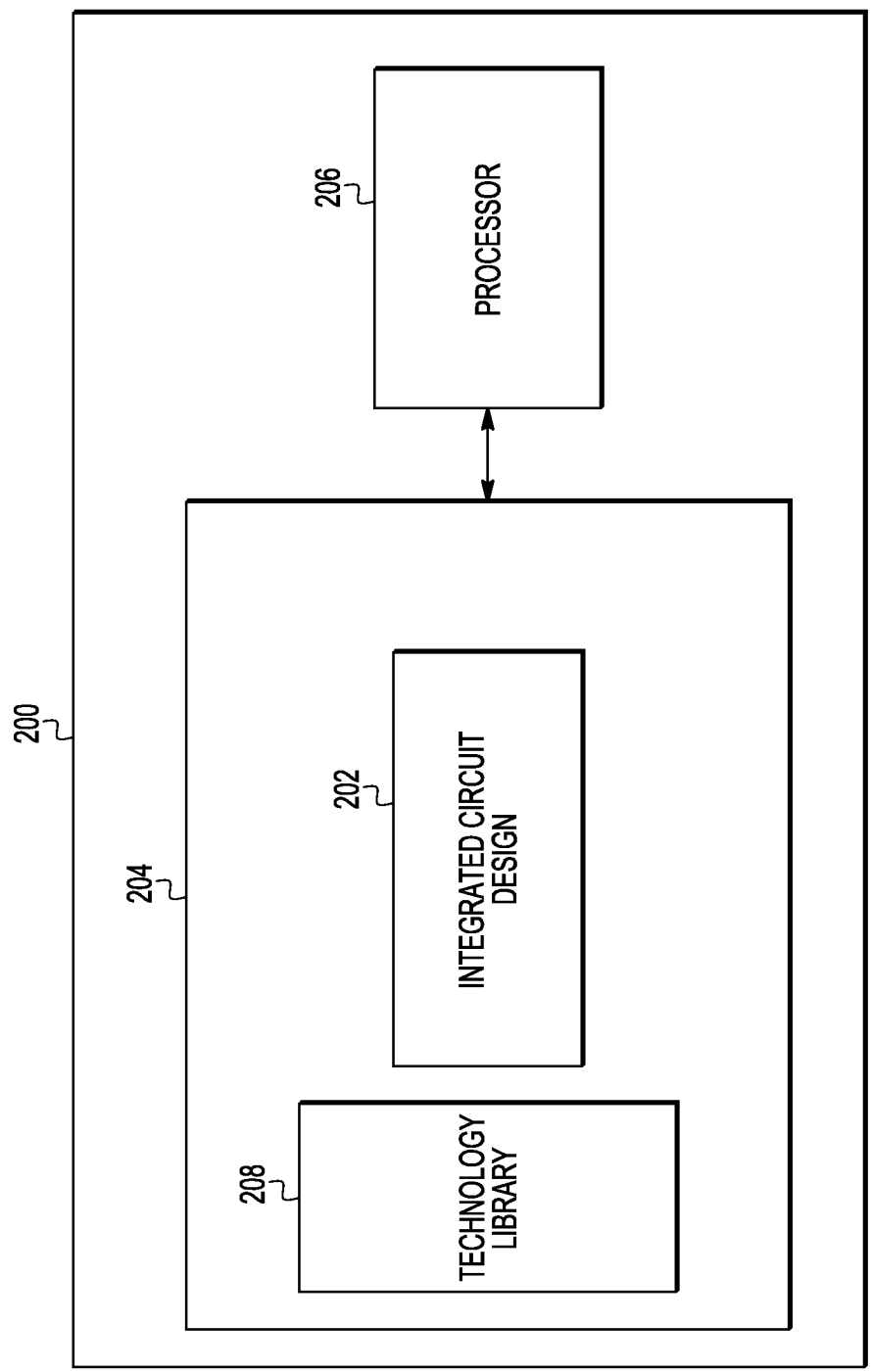
FIG. 2 is a schematic block diagram of an electronic design automation (EDA) tool for reducing dynamic power consumption of an integrated circuit design, in accordance with an embodiment of the present invention.

Referring now to FIG. 2, a schematic block diagram of an electronic design automation (EDA) tool 200 for reducing dynamic power consumption of an integrated circuit (IC) design 202 in accordance with an embodiment of the present invention is shown. The EDA tool 200 includes a memory 204 and a processor 206 in communication with the memory 204. The memory 204 includes a technology library 208. The memory 204 receives and stores the IC design 202. The IC design 202 may include any circuit design that includes digital logic elements, digital memory elements, or combinations thereof. Examples of digital logic elements include an AND gate, an OR gate, a NOT gate, a NOR gate, a NAND gate, an XOR gate, an XNOR gate, and/or a combinational logic circuit that includes a combination of the above-mentioned gates. Examples of digital memory elements include a flip-flop, a latch, a shift-register, a multiplexer and a demultiplexer. The technology library 208 stores instances of the digital memory elements and digital logic elements.

The processor 206 and the memory 204 comprise a computer system that can range from a stand-alone personal computer to a network of processors and memories, to a mainframe system. The computer system must be able to run verification tools that can simulate digital and analog circuits, such as Incisive™ Unified Simulator (IUS) by Cadence Design Systems, Inc. Such tools and computer systems are known to those of skill in the art. Examples of the IC design 202 include microprocessor, microcontroller unit (MCU), system-on-chip (SOC), and application specific IC (ASIC) designs.

Figure 3A:
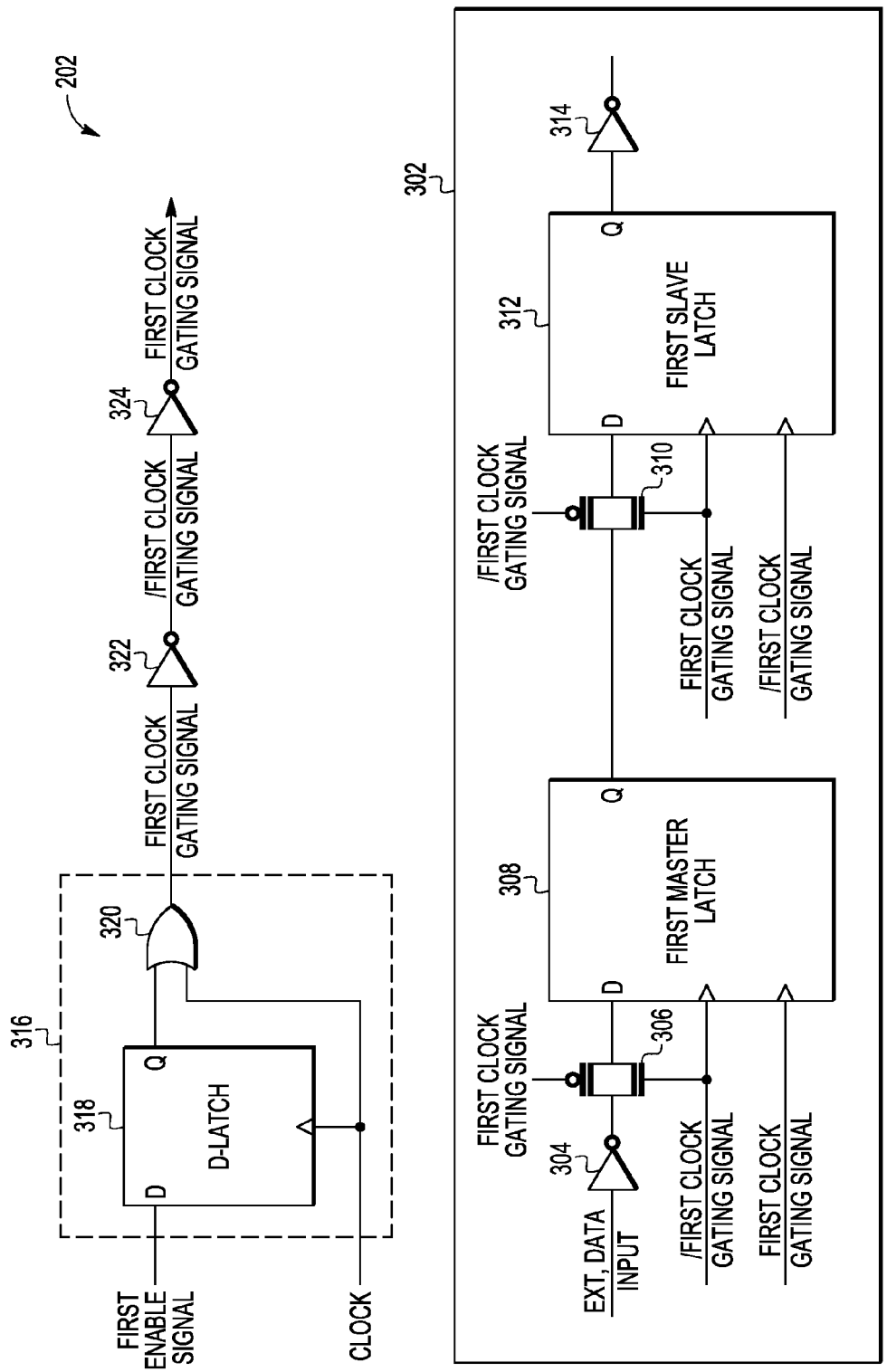
FIG. 3A is a schematic block diagram of a positive-edge triggered flip-flop of the integrated circuit design of FIG. 1, in accordance with an embodiment of the present invention.

FIG. 3A shows a schematic block diagram of a positive-edge triggered flip-flop 302 of the IC design 202, in accordance with an embodiment of the present invention. The flip-flop 302 includes a first data buffer 304, a first pass gate 306, a first master latch 308, a second pass gate 310, a first slave latch 312, and a second data buffer 314. An input terminal of the first data buffer 304 receives an external data input signal. In an embodiment, the data input signal may be provided by the EDA tool 200. An input terminal of the first pass gate 306 is connected to an output terminal of the first data buffer 304 for receiving the data input signal. A data input terminal of the first master latch 308 is connected to an output terminal of the first pass gate 306 for receiving the data input signal. An input terminal of the second pass gate 310 is connected to an output terminal of the first master latch 308 for receiving the data input signal. A data input terminal of the first slave latch 312 is connected to an output terminal of the second pass gate 310 for receiving the data input signal. An input terminal of the second data buffer 314 is connected to an output terminal of the first slave latch 312 for receiving the data input signal and an output terminal of the second pass gate 314 outputs the data input signal.

In operation, the processor 206 initially determines dynamic power consumption of the IC design 202. The processor selects a first set of positive-edge triggered flip-flops of a plurality of flip-flops of the IC design 202 that are enabled by a first enable signal. In an embodiment of the present invention, the first set of flip-flops includes the positive-edge triggered flip-flop 302. The processor 206 initiates clock gating of the positive-edge triggered flip-flop 302 based on the dynamic power consumption of the IC design 202. The processor 206 selects an OR-type clock gating cell 316 from the technology library 208. The OR-type clock gating cell 316 includes a first D latch 318 and an OR gate 320. A data input terminal of the first D latch 318 receives the first enable signal and a clock input terminal thereof receives a clock signal. An output terminal of the first D latch 318 outputs the first enable signal when the clock signal is at logic high state. A first input terminal of the OR gate 320 is connected to the output terminal of the first D latch 318 for receiving the first enable signal and a second input terminal of the OR gate 320 receives the clock signal. An output terminal of the OR gate 320 generates a first clock gating signal. An input terminal of a first NOT gate 322 is connected to the output terminal of the OR gate 320 for receiving the first clock gating signal. The first NOT gate 322 inverts the first clock gating signal and generates an inverted first clock gating signal at an output terminal thereof. An input terminal of a second NOT gate 324 is connected to the output terminal of the first NOT gate 320 for receiving the inverted first clock gating signal. The second NOT gate 324 inverts the inverted first clock gating signal and outputs the first clock gating signal at an output terminal thereof.

The processor 206 connects the output terminal of the second NOT gate 324 to a first clock input terminal of the first pass gate 306 for providing the first clock gating signal and the output terminal of the first NOT gate 322 to a second clock input terminal of the first pass gate 306 for providing the inverted first clock gating signal. The processor 206 further connects the output terminals of the first and second NOT gates 322 and 324 to first and second clock input terminals of the first master latch 308 for providing the inverted-first and first clock gating signals, respectively. The processor 206 further connects the output terminals of the first and second NOT gates 322 and 324 to first and second clock input terminals of the second pass gate 310 for providing the inverted-first and first clock gating signals, respectively. The processor 206 also connects the output terminals of the second and first NOT gates 324 and 322 to first and second clock input terminals of the first slave latch 312 for providing the first and inverted-first clock gating signals.

When the first enable signal and the clock signal are at logic high states, the first D latch 318 outputs the logic high first enable signal at the output terminal thereof. The OR gate 320 outputs the first clock gating signal at logic high state on receiving the logic high first enable signal at the first input terminal thereof. When the first clock input terminal (inverting clock input terminal) of the first pass gate 306 receives the logic high first clock gating signal and the second clock input terminal (non-inverting clock terminal) of the first pass gate 306 receives a logic low inverted first clock gating signal, the first pass gate 306 gates the data input signal. As a result, any change in logic state of the data input signal is not reflected at the data input terminal of the first master latch 308 during clock gating. Also, when the first master latch 308 receives the inverted-first and first clock gating signals at the first and second clock input terminals thereof, respectively, the first master latch 308 is set in a latch mode. Hence, during clock gating, the first master latch 308 holds a logic state of the data input signal received at the data input terminal thereof, thereby not consuming any dynamic power and reducing the dynamic power consumption of the IC design 202.

When the first clock input terminal (inverting clock input terminal) of the second pass gate 310 receives the logic low inverted first clock gating signal, and the second clock input terminal (non-inverting clock terminal) of the second pass gate 310 receives the logic high first clock gating signal, the second pass gate 310 transmits the data input signal to the output terminal thereof. Also, when the first slave latch 312 receives the first and inverted-first clock gating signals at the first and second clock input terminals thereof, respectively, the first slave latch 312 is set in a transparent mode. However, since the first master latch 308 is set in latch mode, there is no change in a logic state of the data input signal outputted at the output terminal of the first master latch 308. As a result, the logic state of the data input signal transmitted by the second pass gate 310 and outputted by the first slave latch 312 remains unchanged, thereby not consuming any dynamic power and reducing the dynamic power consumption of the IC design 202.

Figure 3B:
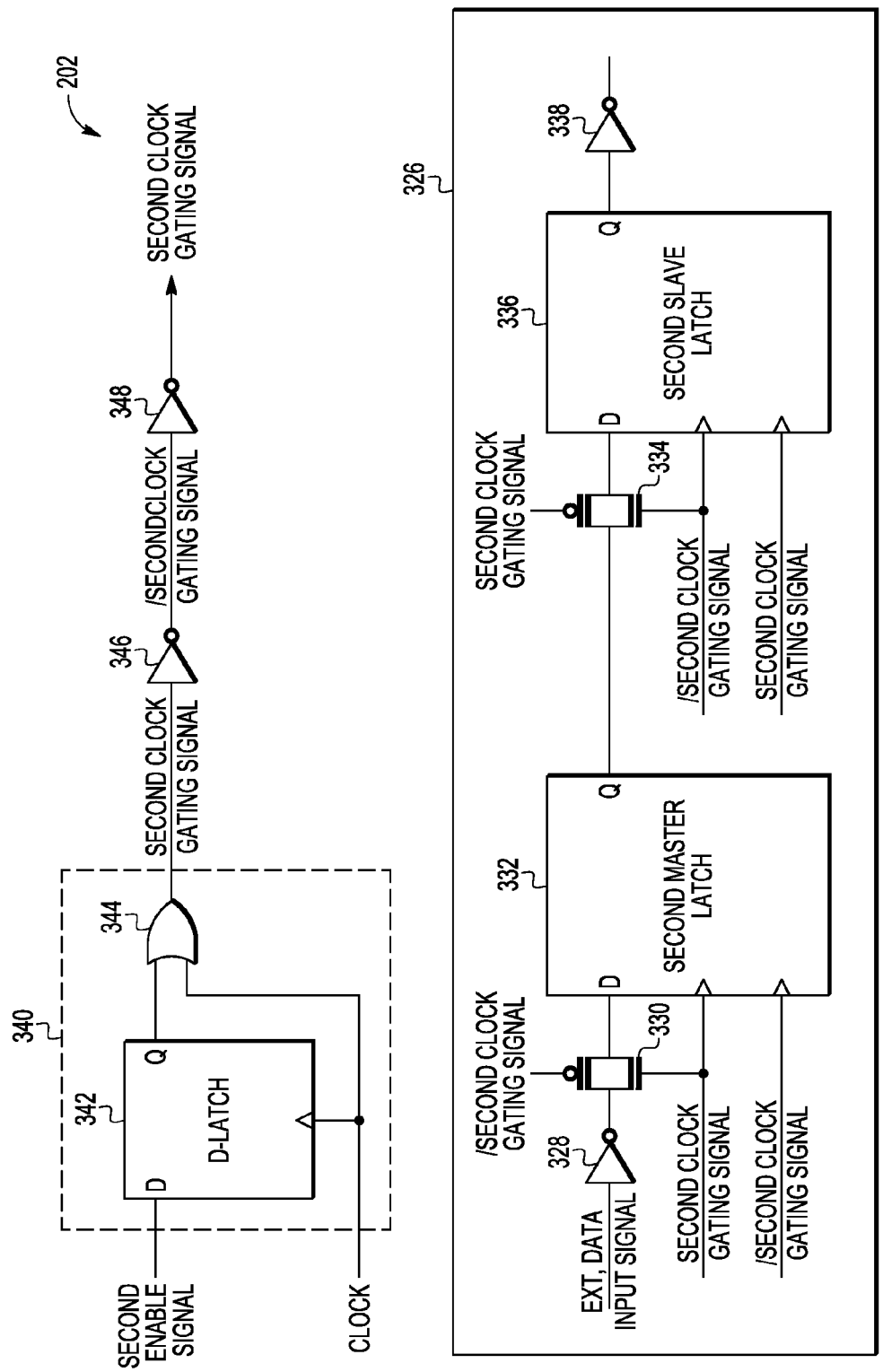
FIG. 3B is a schematic block diagram of a negative-edge triggered flip-flop of the integrated circuit design of FIG. 1, in accordance with an embodiment of the present invention.

FIG. 3B shows a schematic block diagram of a negative-edge triggered flip-flop 326 of the IC design 202, in accordance with an embodiment of the present invention. The negative-edge triggered flip-flop 326 includes a third data buffer 328, a third pass gate 330, a second master latch 332, a fourth pass gate 334, a second slave latch 336, and a fourth data buffer 338. An input terminal of the third data buffer 328 receives the external data input signal. An input terminal of the third pass gate 330 is connected to an output terminal of the third data buffer 328 for receiving the data input signal. A data input terminal of the second master latch 332 is connected to an output terminal of the third pass gate 330 for receiving the data input signal. An input terminal of the fourth pass gate 334 is connected to an output terminal of the second master latch 332 for receiving the data input signal. A data input terminal of the second slave latch 336 is connected to an output terminal of the fourth pass gate 334 for receiving the data input signal. An input terminal of the fourth data buffer 338 is connected to an output terminal of the second slave latch 336 for receiving the data input signal and an output terminal of the fourth pass gate 338 outputs the data input signal.

In operation, the processor 206 determines dynamic power consumption of the IC design 202. The processor selects a second set of negative-edge triggered flip-flops of the plurality of flip-flops that are enabled by a second enable signal. In an embodiment of the present invention, the second set of flip-flops includes the negative-edge triggered flip-flop 326. The processor 206 initiates clock gating of the negative-edge triggered flip-flop 326 based on the dynamic power consumption of the IC design 202. The processor 206 selects an AND-type clock gating cell 340 from the technology library 208. The AND-type clock gating cell 340 includes a second D latch 342 and an AND gate 344. A data input terminal of the second D latch 342 receives the second enable signal and a clock input terminal thereof receives the clock signal. An output terminal of the second D latch 342 outputs the second enable signal when the clock signal is at logic low state. A first input terminal of the AND gate 344 is connected to the output terminal of the second D latch 342 for receiving the second enable signal and a second input terminal of the AND gate 344 receives the clock signal. An output terminal of the AND gate 344 generates a second clock gating signal. An input terminal of a third NOT gate 346 is connected to the output terminal of the AND gate 344 for receiving the second clock gating signal. The third NOT gate 346 inverts the second clock gating signal and generates an inverted second clock gating signal at an output terminal thereof. An input terminal of a fourth NOT gate 348 is connected to the output terminal of the third NOT gate 346 for receiving the inverted-second clock gating signal. The fourth NOT gate 348 inverts the inverted-second clock gating signal and outputs the second clock gating signal at an output terminal thereof.

The processor 206 connects the output terminals of the third and fourth NOT gates 346 and 348 to first and second clock input terminals of the third pass gate 330 for providing the inverted-second and second clock gating signals, respectively. The processor 206 further connects the output terminals of the fourth and third NOT gates 348 and 346 to first and second clock input terminals of the second master latch 332 for providing the second and inverted-second clock gating signals, respectively. The processor 206 further connects the output terminals of the fourth and third NOT gates 348 and 346 to first and second clock input terminals of the fourth pass gate 334 for providing the second and inverted-second clock gating signals, respectively. The processor 206 also connects the output terminals of the third and fourth NOT gates 346 and 348 to first and second clock input terminals of the second slave latch 336 for providing the inverted-second and second clock gating signals.

When the second enable signal and the clock signal are at logic low states, the second D latch 342 outputs the logic low second enable signal at the output terminal thereof. The AND gate 344 outputs the second clock gating signal at logic low state on receiving the logic low second enable signal at the first input terminal thereof. When the first clock input terminal (inverting clock input terminal) of the third pass gate 330 receives a logic high inverted second clock gating signal and the second clock input terminal (non-inverting clock terminal) of the third pass gate 330 receives the logic low second clock gating signal, the third pass gate 330 gates the data input signal. As a result, any change in logic state of the data input signal is not reflected at the data input terminal of the second master latch 332 during clock gating. Also, when the second master latch 332 receives the second and inverted-second clock gating signals at the first and second clock input terminals thereof, respectively, the second master latch 332 is set in the latch mode. Hence, during clock gating, the second master latch 332 holds a logic state of the data input signal received at the data input terminal thereof, thereby not consuming any dynamic power and reducing the dynamic power consumption of the IC design 202.

When the first clock input terminal (inverting clock input terminal) of the fourth pass gate 334 receives the logic low second clock gating signal and the second clock input terminal (non-inverting clock terminal) of the fourth pass gate 334 receives the logic high inverted second clock gating signal, the fourth pass gate 334 transmits the data input signal to the output terminal thereof. Also, when the second slave latch 336 receives the inverted-second and second clock gating signals at the first and second clock input terminals thereof, respectively, the second slave latch 336 is set in the transparent mode. However, since the second master latch 332 is set in the latch mode, there is no change in a logic state of the data input signal outputted at the output terminal of the second master latch 332. As a result, the logic state of the data input signal transmitted by the fourth pass gate 334 and outputted by the second slave latch 336 remains unchanged, thereby not consuming any dynamic power and reducing the dynamic power consumption of the IC design 202.

Therefore, additional design changes are not required to reduce the dynamic power consumption of the IC design 202, thereby saving cost of production and area overheads of a chip on which the IC design 202 is implemented.

Figure 4A:
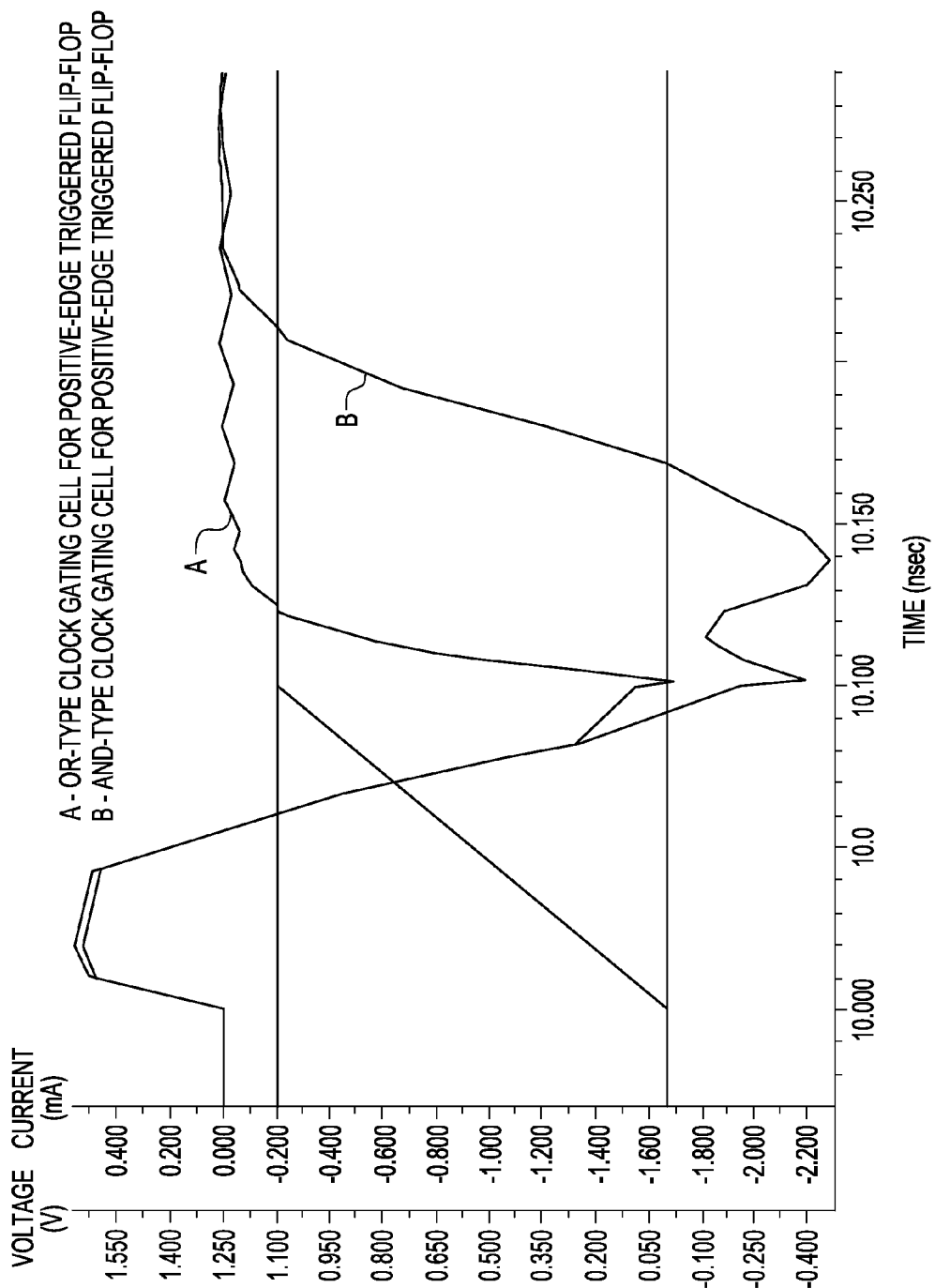
FIG. 4A is a timing diagram illustrating dynamic power consumption of the positive-edge triggered flip-flop of FIG. 3A, in accordance with an embodiment of the present invention.
Figure 4B:
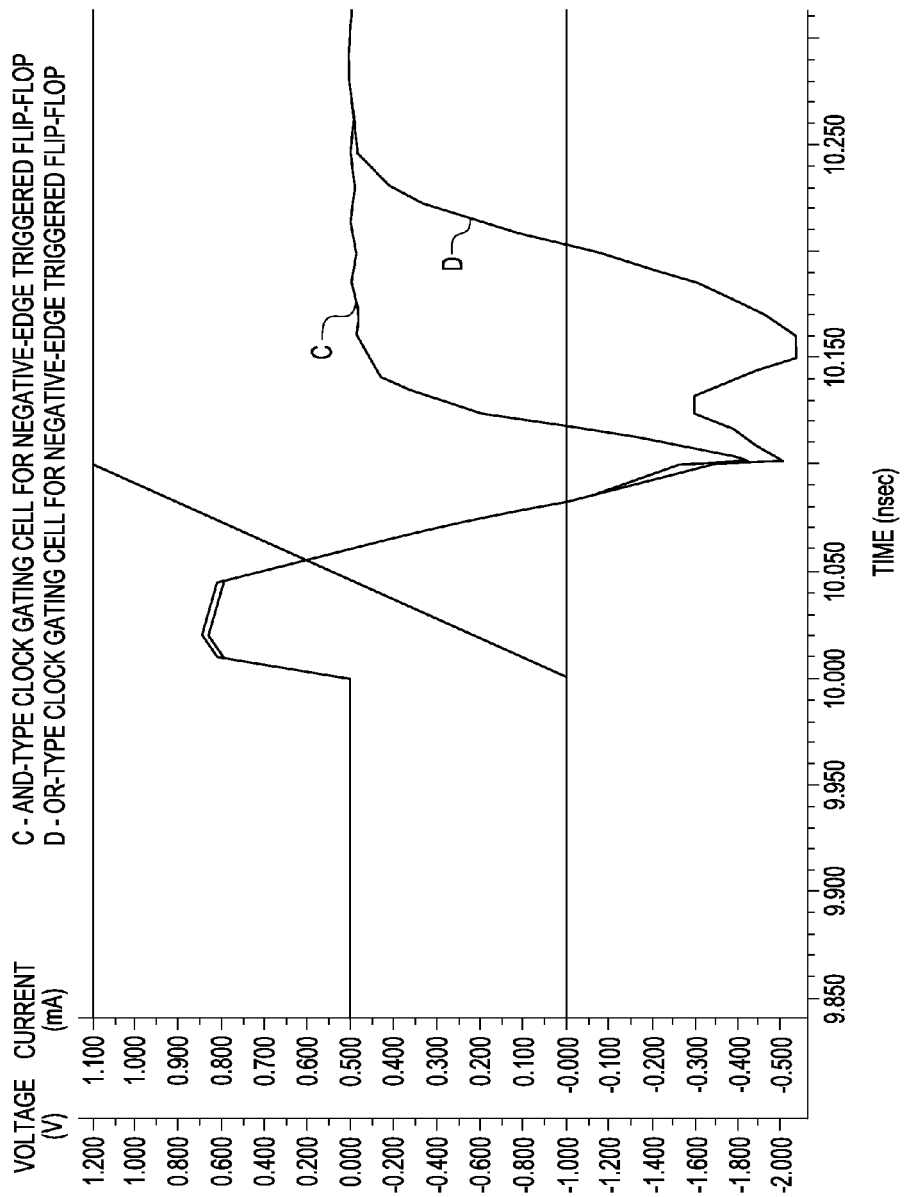
FIG. 4B is a timing diagram illustrating dynamic power consumption of the negative-edge triggered flip-flop of FIG. 3B, in accordance with an embodiment of the present invention.

FIG. 4A shows a timing diagram illustrating dynamic power consumption of the positive-edge triggered flip-flop 302. Area under the curve 'A' illustrates the dynamic power consumption of the positive-edge triggered flip-flop 302 when the processor 206 gates the clock signal by using the OR-type clock gating cell 316. Area under the curve 'B' illustrates the dynamic power consumption of the positive-edge triggered flip-flop 302 when the processor 206 gates the clock signal by using the AND-type clock gating cell 340. The area under the curve 'A' is smaller than the area under the curve 'B', as the dynamic power consumption is reduced when the clock signal received by the positive-edge triggered flip-flop is gated using the OR-type clock gating cell 316.

4B shows a timing diagram illustrating dynamic power consumption of the negative-edge triggered flip-flop 326. Area under the curve 'C' illustrates the dynamic power consumption of the negative-edge triggered flip-flop 326 when the processor 206 gates the clock signal by using the AND-type clock gating cell 340. Area under the curve 'D' illustrates the dynamic power consumption of the negative-edge triggered flip-flop 326 when the processor 206 gates the clock signal by using the OR-type clock gating cell 316. The area under the curve 'C' is smaller than the area under the curve 'D', as the dynamic power consumption is reduced when the clock signal received by the negative-edge triggered flip-flop 326 is gated using the AND-type clock gating cell 340.

Figure 5:
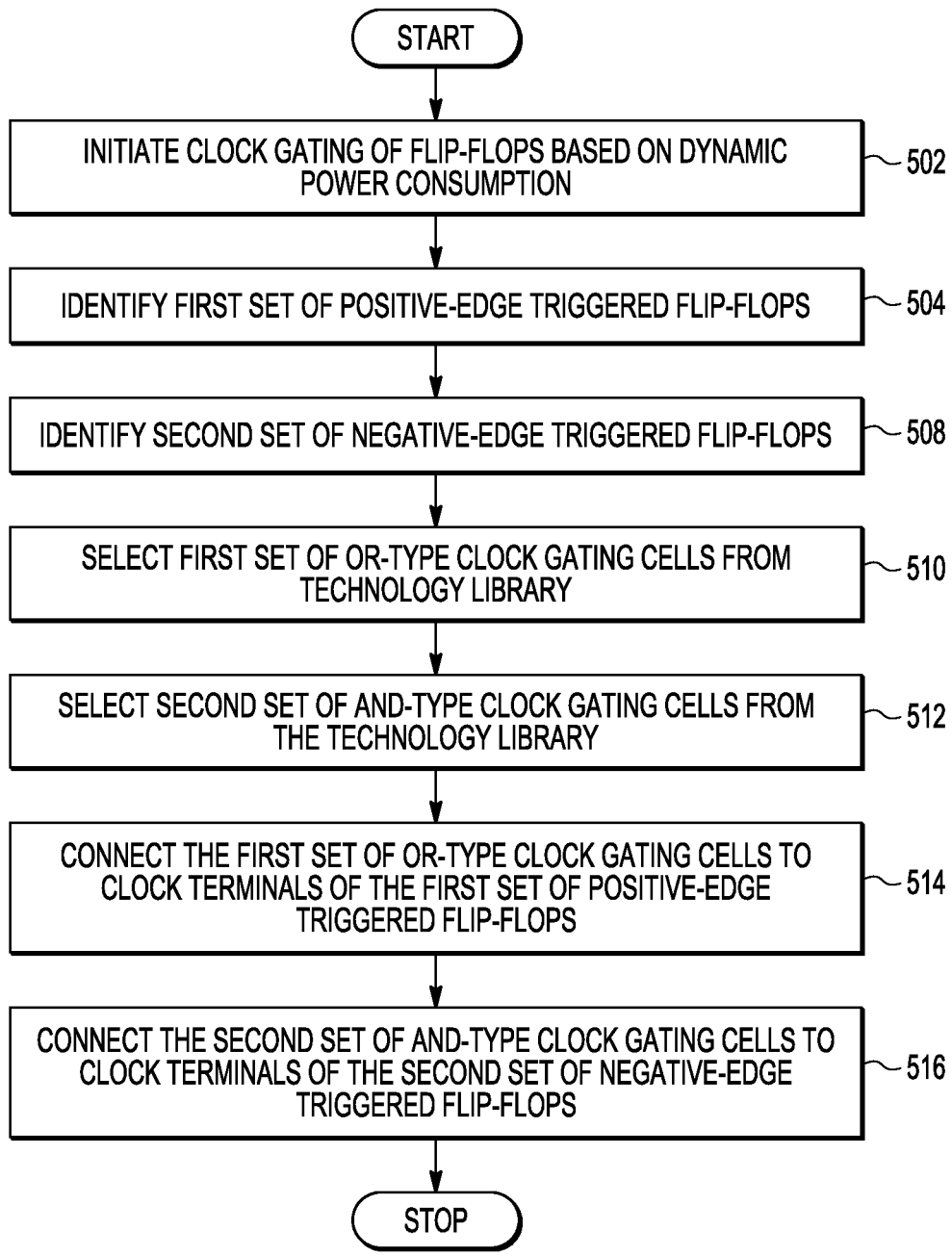
FIG. 5 is a flow chart of a method for reducing dynamic power consumption of an integrated circuit design in accordance with an embodiment of the present invention.

Referring now to FIG. 5, a flowchart illustrating a method for reducing dynamic power consumption of the IC design 202, in accordance with an embodiment of the present invention, is shown. The IC design 202 is input to the EDA tool 200 and stored in the memory 204. The IC design 202, in an example, includes a plurality of flip-flops including the positive-edge and negative-edge triggered flip-flops 302 and 326. At step 502, the processor 206 of the EDA tool 200 determines the dynamic power consumption of the IC design 202. At step 504, the processor 206 initiates clock gating of the plurality of flip-flops of the IC design 202 based on the dynamic power consumption. At step 506, the processor 206 identifies the first set of positive-edge triggered flip-flops of the plurality of flip-flops. At step 508, the processor 206 identifies the second set of negative-edge triggered flip-flops of the plurality of flip-flops. At step 510, the processor 206 selects a first set of OR-type clock gating cells from the technology library 208. At step 512, the processor 206 selects a second set of AND-type clock gating cells from the technology library 208. At step 514, the processor 206 connects the first set of OR-type clock gating cells to clock terminals of the first set of positive-edge triggered flip-flops. At step 516, the processor 206 connects the second set of AND-type clock gating cells to clock terminals of the second set of negative-edge triggered flip-flops.

Thus, the IC design 202 is modified by executing the steps 502-516. The modified IC design is used to fabricate an IC using known processes (i.e., the necessary design data files are sent to a fabrication facility and the IC is fabricated on a semiconductor wafer).

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for making an integrated circuit, comprising:
   modifying an initial integrated circuit design to reduce dynamic power consumption of the design using an electronic design automation (EDA) tool, wherein the EDA tool includes a memory for storing the initial design and a technology library, and a processor coupled to the memory, wherein the initial design includes a plurality of flip-flops, and wherein modifying the initial design comprises:
      identifying, by the processor, a first set of positive-edge triggered flip-flops and a second set of negative-edge triggered flip-flops of the plurality of flip-flops;
      selecting, from the technology library, a first set of OR-type clock gating cells and a second set of AND-type clock gating cells;
      connecting the first set of OR-type clock gating cells to clock terminals of corresponding ones of the first set of positive-edge triggered flip-flops, and the second set of AND-type clock gating cells to clock terminals of corresponding ones of the second set of negative-edge triggered flip-flops;
      saving the modified initial design in the memory; and
   fabricating the integrated circuit using the modified initial design.

2. The method of claim 1, further comprising receiving an external clock signal and generating first and inverted first clock gating signals by each OR-type clock gating cell of the first set of OR-type clock gating cells and receiving the external clock signal and generating second and inverted second clock gating signals by each AND-type clock gating cell of the second set of AND-type clock gating cells.

3. The method of claim 2, wherein a positive-edge triggered flip-flop includes:
   a first pass gate having an input terminal for receiving an external data input signal, first and second clock input terminals for receiving the first and inverted first clock gating signals, respectively, from a corresponding one of the OR-type clock gating cells, and an output terminal for transmitting the external data input signal;
   a master latch having a data input terminal connected to the output terminal of the first pass gate for receiving the external data input signal, first and second clock input terminals for receiving the inverted first and first clock gating signals, respectively, from a corresponding one of the OR-type clock gating cells, and an output terminal for outputting the external data input signal when the external clock signal is at logic low state;
   a second pass gate having an input terminal connected to the output terminal of the master latch for receiving the external data input signal, first and second clock input terminals for receiving the inverted first and first clock gating signals, respectively, from one of the corresponding OR-type clock gating cells, and an output terminal for transmitting the external data input signal; and
   a slave latch having a data input terminal connected to the output terminal of the second pass gate for receiving the external data input signal, and an output terminal for outputting the external data input signal when the external clock signal is in a logic high state.

4. The method of claim 3, further comprising gating the external data input signal by the first pass gate when the first and inverted first clock gating signals are at logic high and logic low states, respectively, and enabling transmission of the external data input signal by the first pass gate when the first and inverted first clock gating signals are at logic low and logic high states, respectively.

5. The method of claim 4, further comprising setting the master latch in a latch mode when the first and inverted first clock gating signals are at logic high and logic low states, respectively, and a transparent mode when the first and inverted first clock gating signals are at logic low and logic high states, respectively.

6. The method of claim 2, wherein a negative-edge triggered flip-flop includes:
   a first pass gate having an input terminal for receiving an external data input signal, first and second clock input terminals for receiving the inverted second and second clock gating signals, respectively, from one of the corresponding AND-type clock gating cells, and an output terminal for transmitting the external data input signal;
   a master latch having a data input terminal connected to the output terminal of the first pass gate for receiving the external data input signal, first and second clock input terminals for receiving the second and inverted second clock gating signals, respectively, from a corresponding one of the AND-type clock gating cells, and an output terminal for outputting the external data input signal when the external clock signal is at logic high state;
   a second pass gate having an input terminal connected to the output terminal of the master latch for receiving the external data input signal, first and second clock input terminals for receiving the second and inverted second clock gating signals, respectively, from a corresponding one of the AND-type clock gating cells, and an output terminal for transmitting the external data input signal; and
   a slave latch having a data input terminal connected to the output terminal of the second pass gate for receiving the external data input signal, and an output terminal for outputting the external data input signal when the external clock signal is at logic low state.

7. The method of claim 6, further comprising gating the external data input signal by the first pass gate when the second and inverted second clock gating signals are at logic low and logic high states, respectively, and enabling transmission of the external data input signal by the first pass gate when the second and inverted second clock gating signals are at logic high and logic low states, respectively.

8. The method of claim 7, further comprising setting the master latch in a latch mode when the second and inverted second clock gating signals are at logic low and logic high states, respectively, and a transparent mode when the second and inverted second clock gating signals are at logic high and logic low states, respectively.

* * * * *